(12) United States Patent
Kato (10) Patent No.: US 11,404,709 B2
(45) Date of Patent: Aug. 2, 2022

(54) FUEL CELL SYSTEM

(71) Applicant: TOYOTA JIDOSHA KABUSHIKI KAISHA, Toyota (JP)

(72) Inventor: Sho Kato, Anjo (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 17/226,402

(22) Filed: Apr. 9, 2021

(65) Prior Publication Data

US 2021/0376346 A1   Dec. 2, 2021

(30) Foreign Application Priority Data

May 27, 2020 (JP) .............................. JP2020-092623

(51) Int. Cl.
| | |
|---|---|
| *H01M 8/04291* | (2016.01) |
| *H01M 8/04828* | (2016.01) |
| *H01M 8/04119* | (2016.01) |
| *B60L 58/30* | (2019.01) |
| *H01M 8/04298* | (2016.01) |

(52) U.S. Cl.
CPC ... *H01M 8/04291* (2013.01); *H01M 8/04843* (2013.01); *B60L 58/30* (2019.02); *H01M 8/04179* (2013.01); *H01M 8/04298* (2013.01); *H01M 2250/20* (2013.01)

(58) Field of Classification Search
CPC ......... H01M 8/04291; H01M 8/04843; H01M 2250/20; H01M 8/04179; H01M 8/04298; B60L 58/30
See application file for complete search history.

(56) References Cited

U.S. PATENT DOCUMENTS

| | | | |
|---|---|---|---|
| 2016/0141671 A1 | 5/2016 | Ogawa et al. | |
| 2019/0103615 A1* | 4/2019 | Sakajo | H01M 8/04701 |

FOREIGN PATENT DOCUMENTS

| | | |
|---|---|---|
| JP | 2007048650 A | 2/2007 |
| JP | 2007172884 A | 7/2007 |
| JP | 2016095997 A | 5/2016 |

* cited by examiner

*Primary Examiner* — Stewart A Fraser
(74) *Attorney, Agent, or Firm* — Dickinson Wright, PLLC (57) ABSTRACT

Provide is a fuel cell system capable of controlling the timing of a water removal process to suppress users' uncomfortableness. A fuel cell system with which a vehicle is equipped includes: a fuel cell; a water removal process gas supply part; a current location information acquisition part; a destination information acquisition part; and a water removal process control part, wherein the water removal process control part changes a state thereof to a water removal process allowed state if at least one of predetermined conditions is satisfied, the water removal process control part performs the water removal process if the distance from the current location to the destination is at a second threshold or under in the water removal process allowed state, and the water removal process control part sets the state thereof in a water removal process prohibited state after performing the water removal process.

4 Claims, 4 Drawing Sheets

FUEL CELL SYSTEM

FIELD

The present application relates to a fuel cell system.

BACKGROUND

A fuel cell vehicle that is an environmental-friendly low emission vehicle has been put to practical use in recent years. The fuel cell vehicle is equipped with a fuel cell system for supplying a fuel gas and an oxidant gas to generate electricity by the electrochemical reaction. Generally, water is removed while the vehicle is being driven or stopped since such an electrochemical reaction produces water as a by-product. For example, the following documents describe some techniques on such a water removal process.

Patent Literature 1 discloses a fuel cell system capable of controlling a vehicle equipped with the system so that removal of water in a fuel cell is completed when the vehicle reaches a destination. Patent Literature 1 describes that such a water removal operation is started if it is determined that the vehicle is within a predetermined distance from a destination, or if it is determined that the time to get the destination is within a predetermined time.

Patent Literature 2 discloses a water drainage device to execute a process such as invalidation of a water drainage process if the amount of water included in a fuel cell is equal to or lower than a predetermined value, which can suppress excessive water drainage from the fuel cell. Patent Literature 3 discloses a technique of generating electricity in a water removal mode to control the amount of water removed from a fuel cell so that the amount is larger than the sum of the generated water amount and the supplied water amount if a fuel cell vehicle is determined to reach a destination, which makes it possible to reduce water in the fuel cell in advance to shorten the time for a stopping operation.

CITATION LIST

Patent Literature

Patent Literature 1: JP 2007-48650 A
Patent Literature 2: JP 2016-95997 A
Patent Literature 3: JP 2007-172884 A

SUMMARY

Technical Problem

Sound from the water removal process of a fuel cell vehicle may feel uncomfortable for users according to the timing of the process.

With the foregoing actual circumstances in view, an object of the present application is to provide a fuel cell system capable of controlling the timing of a water removal process to suppress users' uncomfortableness.

Solution to Problem

As a first embodiment to solve the foregoing problem, the present application discloses a fuel cell system with which a vehicle is equipped, the fuel cell system comprising: a fuel cell; a water removal process gas supply part capable of supplying a gas for a water removal process for water in the fuel cell; a current location information acquisition part capable of acquiring information on a current location; a destination information acquisition part capable of acquiring information on a destination; and a water removal process control part controlling execution of the water removal process, wherein the water removal process control part changes a state thereof to a water removal process allowed state if at least one of the following conditions is satisfied: if a distance from the current location to the destination is at a first threshold or over; if at least a predetermined time has passed since a last water removal process; if a driving distance after the last water removal process is at least a predetermined distance; and if at least a predetermined amount of water is generated after the last water removal process, the water removal process control part performs the water removal process if the distance from the current location to the destination is at a second threshold or under in the water removal process allowed state, and the water removal process control part sets the state thereof in a water removal process prohibited state after performing the water removal process.

In the first embodiment, the water removal process control part might not perform the water removal process when the vehicle is being activated. The fuel cell system according to the first embodiment may further comprise: a noise state determination part determining a noise state, wherein if the noise state determination part determines a background noise state, the water removal process control part does not perform the water removal process.

As a second embodiment to solve the foregoing problem, the present application discloses a fuel cell system with which a vehicle is equipped, the fuel cell system comprising: a fuel cell; a water removal process gas supply part capable of supplying a gas for a water removal process for water in the fuel cell; a current location information acquisition part capable of acquiring information on a current location; a destination information acquisition part capable of acquiring information on a destination; a water removal process control part controlling execution of the water removal process; and a noise state determination part determining a noise state, wherein the water removal process control part performs the water removal process if a distance from the current location to the destination is at a second threshold or under, and does not perform the water removal process if the noise state determination part determines a background noise state even if the distance from the current location to the destination is at the second threshold or under.

Advantageous Effects

The fuel cell system according to the present disclosure is capable of controlling the timing of a water removal process to suppress users' uncomfortableness.

DESCRIPTION OF EMBODIMENTS

First Embodiment

The first embodiment of the fuel cell system according to the present disclosure will be described. The first embodiment in the present disclosure is a fuel cell system with which a vehicle is equipped, the fuel cell system comprising: a fuel cell; a water removal process gas supply part capable of supplying a gas for a water removal process for water in the fuel cell; a current location information acquisition part capable of acquiring information on a current location; a destination information acquisition part capable of acquiring information on a destination; and a water removal process control part controlling execution of the water removal process, wherein the water removal process control part changes a state thereof to a water removal process allowed state if at least one of the following conditions is satisfied: if a distance from the current location to the destination is at a first threshold or over; if at least a predetermined time has passed since the last water removal process; if a driving distance after the last water removal process is at least a predetermined distance; and if at least a predetermined amount of water is generated after the last water removal process, the water removal process control part performs the water removal process if the distance from the current location to the destination is at a second threshold or under in the water removal process allowed state, and the water removal process control part sets the state thereof in a water removal process prohibited state after performing the water removal process.

Figure 1:
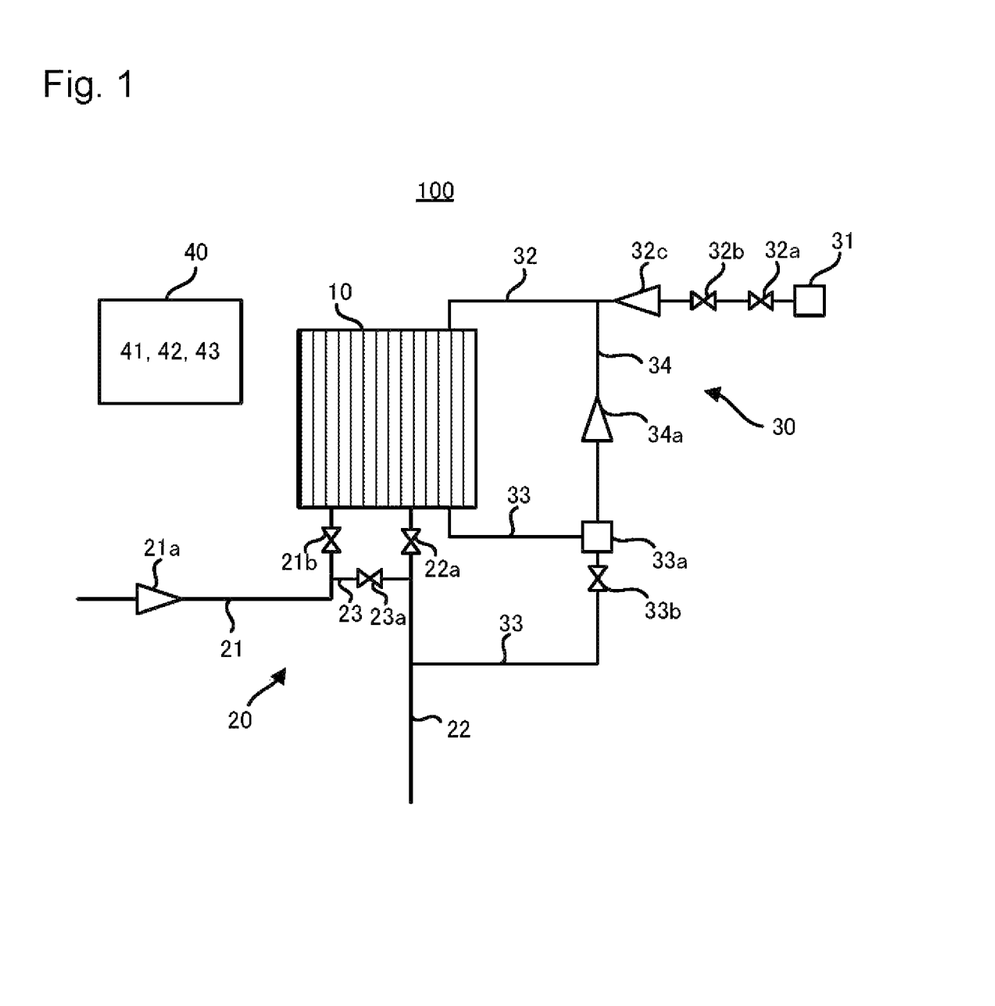
FIG. 1 is a block diagram of a fuel cell system 100.

Hereinafter the description will be given using a fuel cell system 100 that is one example of the first embodiment. FIG. 1 shows a block diagram of the fuel cell system 100. The first embodiment is not limited to this though.

The fuel cell system 100, with which a vehicle is to be equipped, includes a fuel cell 10, an oxidant gas supply and removal part 20, a fuel gas supply and removal part 30 and a control part 40 as in FIG. 1. In addition to the foregoing, the fuel cell system 100 may include any member that is generally included in a fuel cell system. Examples of such a member include a refrigerant flow path for a refrigerant to cool the fuel cell 10 flowing therein.

<Fuel Cell 10>

A function of the fuel cell 10 is generating electricity in response to the supply of an oxidant gas and a fuel gas. Any known fuel cell that can be used for the fuel cell system 100 can be used as the fuel cell 10 without particular limitations. Examples of such a fuel cell include polymer electrolyte fuel cells. The fuel cell 10 may have a stacked structure formed of a plurality of stacked single cells. Here, a face of the fuel cell 10 where the oxidant gas supply and removal part 20 is connected may be referred to as a cathode, and a face thereof where the fuel gas supply and removal part 30 is connected may be referred to as an anode. The oxidant gas supplied to the fuel cell 10 is consumed on the cathode by the fuel cell reaction. The oxidant gas in a wet state because of water generated by this reaction is removed from the fuel cell 10. The wet oxidant gas removed from the fuel cell 10 is referred to as an oxidant off-gas. Likewise, the fuel gas supplied to the fuel cell 10 is consumed on the anode by the fuel cell reaction. The fuel gas in a wet state because of water generated by this reaction is removed from the fuel cell 10. The wet fuel gas removed from the fuel cell 10 is referred to as a fuel off-gas. Here, examples of the fuel gas include hydrogen gas, and examples of the oxidant gas include air.

<Oxidant Gas Supply and Removal Part 20>

The oxidant gas supply and removal part 20 has an oxidant gas supply function for supplying the oxidant gas to the fuel cell 10, an oxidant gas removal function for removing the oxidant gas that is removed from the fuel cell 10 (which is also referred to as "oxidant off-gas") to the outside, and a bypass function for removing the oxidant gas to the outside without any intervention of the fuel cell 10.

The oxidant gas supply and removal part 20 includes an oxidant gas supply flow path 21 that is a pipe for the oxidant gas supplied to the cathode flowing therein, an oxidant gas removal flow path 22 that is a pipe for removing the oxidant gas that is discharged from the cathode to the outside of the system, and a bypass flow path 23 that is a pipe connecting the oxidant gas supply flow path 21 and the oxidant gas removal flow path 22. Other than the foregoing, the oxidant gas supply and removal part 20 may include any member that is generally included in an oxidant gas supply and removal part.

The oxidant gas supply flow path 21 is a pipe for the oxidant gas supplied to the cathode flowing therein, and includes a compressor 21a and an inlet valve 21b. The compressor 21a is to absorb the oxidant gas from an absorption side thereof, and to supply the compressed oxidant gas to the fuel cell 10 side. The inlet valve 21b is a motor-operated valve for adjusting the flow resistance of the oxidant gas supply flow path 21, and is arranged on the downstream side of the compressor 21a. In the fuel cell system 100, the opening degree of the inlet valve 21b is set in 100% when the compressor 21a is driven and the fuel cell 10 generates electricity, and is set in 0% when the compressor 21a is stopped and the fuel cell 10 stops generating electricity.

The oxidant gas removal flow path 22 is a pipe for removing the oxidant off-gas via the cathode of the fuel cell 10, and includes a pressure regulating valve 22a on the upstream side of a portion where the bypass flow path 23 is connected. The pressure regulating valve 22a is a motor-operated valve, and is capable of changing the opening degree thereof according to a command from the control part 40. The change of the opening degree of the pressure regulating valve 22a changes the flow resistance of the oxidant gas removal flow path 22, and regulates the back pressures in the flow paths on the cathode side of the fuel cell 10.

The bypass flow path 23 is a pipe such that one end thereof is connected to a portion of the oxidant gas supply flow path 21 which is between the compressor 21a and the inlet valve 21b, and the other end thereof is connected to the oxidant gas removal flow path 22 on the downstream side of the pressure regulating valve 22a. The bypass flow path 23 is a flow path for removing the oxidant gas that is discharged from the compressor 21a to the outside without any intervention of the fuel cell 10. The bypass flow path 23 includes a flow divider valve 23a. The flow divider valve 23a is a motor-operated valve, and is capable of changing the opening degree thereof according to a command from the control part 40. The change of the opening degree of the flow divider valve 23a changes the flow resistance of the bypass flow path 23, and adjusts the flow rate of air flowing from the oxidant gas supply flow path 21 to the bypass flow path 23.

<Fuel Gas Supply and Removal Part 30>

The fuel gas supply and removal part 30 has a fuel gas supply function for supplying the fuel gas to the fuel cell 10, a fuel gas removal function for removing the fuel gas that is discharged from the anode of the fuel cell 10 (which is also referred to as "fuel off-gas") to the outside, and a fuel gas circulation function for circulating the fuel gas through the fuel cell system 100.

The fuel gas supply and removal part 30 includes a fuel gas supply source 31, a fuel gas supply flow path 32 that is a pipe for the fuel gas supplied to the anode flowing therein, a fuel off-gas removal flow path 33 that is a pipe for the fuel gas removed via the anode flowing therein, and a circulation flow path 34 that is a pipe connecting the fuel gas supply flow path 32 and the fuel off-gas removal flow path 33. Other than the foregoing, the fuel gas supply and removal part 30 may include any member that is generally included in a fuel gas supply and removal part.

For example, the fuel gas supply source 31 is formed of a high pressure hydrogen tank, a hydrogen storage alloy, or the like. For example, a 35 MPa or 70 MPa hydrogen gas is stored in the fuel gas supply source 31. Opening an on-off valve 32a lets hydrogen gas flow out from the fuel gas supply source 31 to the fuel gas supply flow path 32. The fuel gas supply source 31 may be formed of a reformer that generates a hydrogen-rich reformed gas from hydrocarbon fuels, and a high pressure tank that brings the reformed gas generated by this reformer to a high pressure condition and keeps this condition therein.

The fuel gas supply flow path 32 is a pipe such that one end thereof is connected to the fuel gas supply source 31 and the other end thereof is connected to the fuel cell 10, and is a flow path for the fuel gas supplied to the anode flowing therein. The fuel gas supply flow path 32 includes the on-off valve 32a, a pressure reducing valve 32b and an injector 32c. The on-off valve 32a is disposed on the outlet side of the fuel gas supply source 31, opens and closes the fuel gas supply flow path 32 according to a command from the control part 40, and lets the fuel gas flow from the fuel gas supply source 31 to the fuel gas supply flow path 32. The pressure reducing valve 32b is disposed on the downstream side of the on-off valve 32a. The opening degree of the pressure reducing valve 32b is controlled according to a command from the control part 40, to regulate the pressure of the fuel gas in the fuel gas supply flow path 32. The injector 32c is an electromagnetically-driven on-off valve that is disposed on the downstream side of the pressure reducing valve 32b. The opening degree of the injector 32c is controlled according to a command from the control part 40, to supply the fuel gas to the fuel cell 10.

The fuel off-gas removal flow path 33 is a pipe such that one end thereof is connected to the fuel cell 10 and the other end thereof is connected to the oxidant gas removal flow path 22, and is a flow path for the fuel off-gas discharged from the anode flowing therein. The fuel off-gas is removed to the outside of the system via the oxidant gas removal flow path 22. The fuel off-gas removal flow path 33 includes a gas-liquid separator 33a and a gas and water removal valve 33b. The gas-liquid separator 33a separates gas components and liquid water components in the fuel off-gas discharged from the fuel cell 10. As described above, since the fuel off-gas is a wet fuel gas containing water, the major gas component separated by the gas-liquid separator 33a is the fuel gas, and the major liquid water component separated by the gas-liquid separator 33a is water. The gas and water removal valve 33b is arranged on the downstream side of the gas-liquid separator 33a, and is for controlling the removal of the liquid water components separated by the gas-liquid separator 33a. Opening and closing of the gas and water removal valve 33b are controlled by the control part 40. The liquid water removed via the gas and water removal valve 33b is fed to the oxidant gas removal flow path 22 together with the gas components, and the liquid water and the gas components are removed to the outside of the system.

The circulation flow path 34 is a pipe connecting the fuel gas supply flow path 32 and the fuel off-gas removal flow path 33, and is a flow path for returning the fuel gas separated by the gas-liquid separator 33a to the fuel gas supply flow path 32 again. One end of the circulation flow path 34 is connected to the fuel gas supply flow path 32 on the downstream side of the injector 32c, and the other end thereof is connected to the gas-liquid separator 33a. The circulation flow path 34 includes a circulating pump 34a. The operation of the circulating pump 34a is controlled according to a command from the control part 40. The operation of the circulating pump 34a causes the fuel gas in the fuel gas circulation flow path 34 to be fed to the fuel gas supply flow path 32.

<Various Sensors>

Here, the fuel cell system 100 includes various sensors. For example, the fuel cell system 100 includes a driving distance acquisition part to acquire a driving distance of a vehicle, and a water amount acquisition part to acquire the amount of water in the fuel cell 10. The driving distance can be acquired from driving data of a vehicle. For example, the amount of water in the fuel cell 10 can be acquired based on the relationship between the cell resistance of and the amount of water in the fuel cell 10. The cell resistance can be measured by the AC impedance method.

<Control Part 40>

The control part 40 controls the whole of the fuel cell system 100 based on data from the various sensors, and controls the oxidant gas supply and removal part 20, the fuel gas supply and removal part 30, etc. in response to requests. For example, the control part 40 is a computer configured by CPU, ROM, RAM, etc. The control part 40 executes software corresponding to various kinds of control, to control the whole of the fuel cell system 100.

The control part 40 includes a current location information acquisition part 41 capable of acquiring current location information, a destination information acquisition part 42 capable of acquiring destination information, and a water removal process control part 43 to control execution of a water removal process for water in the fuel cell 10.

The current location information acquisition part 41 is capable of acquiring current location information of a vehicle. The destination information acquisition part 42 is capable of acquiring destination information of a vehicle. For example, the current location information acquisition part 41 and the destination information acquisition part 42 are in a car navigation system utilizing GPS (global positioning system). Here, "destination" may be a destination inputted by a user, or may be a destination estimated from historical information on roads, destinations, etc. where a vehicle drove in the past.

The water removal process control part 43 controls execution of the water removal process for water in the fuel cell 10. "Water removal process" is a process to remove water generated by the electrochemical reaction of the oxidant gas and the fuel gas from the inside of the fuel cell 10 to the outside of the system. The water removal process is executed by a water removal process gas supply part capable of supplying a gas for the water removal process for water in the fuel cell 10. The water removal process gas supply part in the fuel cell system 100 is either or both of the oxidant gas supply and removal part 20 and the fuel gas supply and removal part 30. For example, the water removal process is carried out as follows.

First, the water removal process by the oxidant gas supply and removal part 20 is to operate the compressor 21a, to supply the oxidant gas to the fuel cell 10 as the water removal process gas, and to remove water in the cathode of the fuel cell 10 to the outside of the system, as the supply of the fuel gas to the fuel cell 10 is stopped. The water removal process by the fuel gas supply and removal part 30 is to operate the circulating pump 34a, to supply the fuel gas to the fuel cell 10 as the water removal process gas, and to remove water in the anode of the fuel cell 10 to the outside of the system, as the supply of the fuel gas from the fuel gas supply source 31 to the fuel cell 10 is stopped. As described above, the water removal process is carried out using either or both of the oxidant gas supply and removal part 20 and the fuel gas supply and removal part 30. The water removal process in the fuel cell 10 may be carried out using a water removal process gas supply part individually disposed, but not using the oxidant gas supply and removal part 20 and/or the fuel gas supply and removal part 30.

Next, the timing when the water removal process is carried out will be described. In Patent Literature 1, the timing when the water removal process is carried out is determined based on the distance to the destination and the time to get the destination. However, the distance to the destination or the time to arrive at the destination may be longer according to a detour based on the driver's intention, curves, turns, etc. In such a case, it may be impossible to carry out the water removal process at a suitable timing in the method according to Patent Literature 1. If the distance to the destination is short, the water removal process may be carried out again although having been carried out already. Such a water removal process may feel uncomfortable for users, which leads to lowered customer satisfaction.

To solve the foregoing problem, in the fuel cell system 100, the water removal process control part 43 changes a state thereof to the water removal process allowed state if at least one of the following conditions is satisfied: if the distance from the current location to the destination is at the first threshold or over; if at least a predetermined time has passed since the last water removal process; if the driving distance after the last water removal process is at least a predetermined distance; and if at least a predetermined amount of water is generated after the last water removal process, the water removal process control part 43 performs the water removal process if the distance from the current location to the destination is at the second threshold or under in the water removal process allowed state, and the water removal process control part 43 sets the state thereof in the water removal process prohibited state after performing the water removal process.

Figure 2:
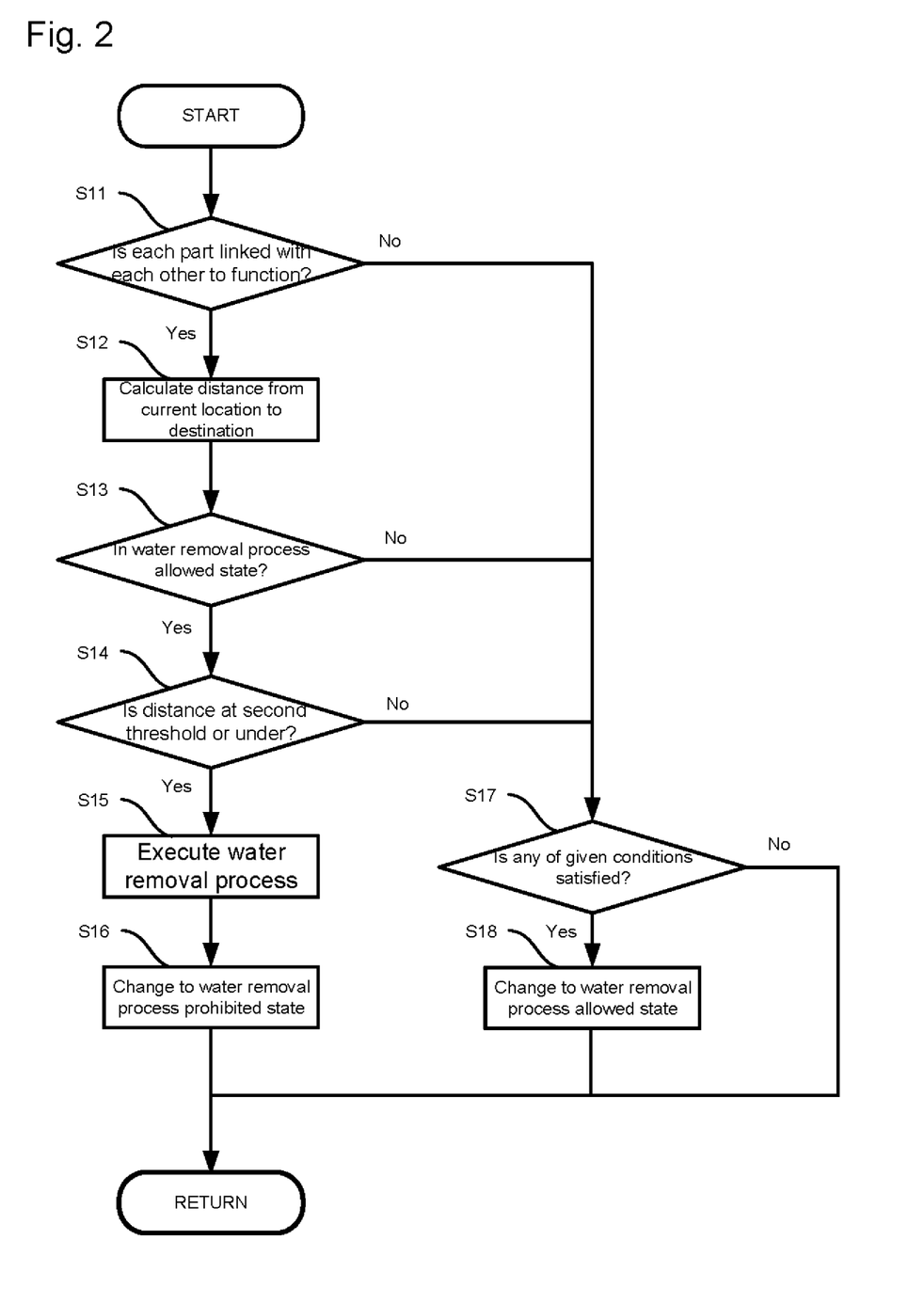
FIG. 2 is one example of a flowchart of water removal control according to the first embodiment (fuel cell system 100)

Such water removal control in the fuel cell system 100 will be described using the flowchart in FIG. 2. As in FIG. 2, the water removal control in the fuel cell system 100 includes the steps S11 to S18. The water removal control according to the first embodiment is not limited to this though.

In the step S11, it is determined whether the current location information acquisition part 41, the destination information acquisition part 42 and the water removal process control part 43 are linked with each other to function. If it is determined that they are linked with each other to function, the step S12 is performed. If it is determined that they are not linked with each other to function, the step S17 is performed.

In the step S12, the distance from the current location to the destination is calculated based on data in the current location information acquisition part 41 and the destination information acquisition part 42. For example, this distance can be calculated by using a car navigation system. After the step S12 is completed, the step S13 is performed.

In the step S13, it is determined whether the water removal process control part 43 is in the water removal process allowed state. "Water removal process allowed state" is a state where execution of the water removal process is allowed. If the distance from the current location to the destination is not at the second threshold or under as described later, the water removal process is not executed even in the water removal process allowed state. If it is determined that the water removal process control part 43 is in the water removal process allowed state, the step S14 is performed. If it is determined that the water removal process control part 43 is not in the water removal process allowed state, the step S17 is performed.

In the step S14, it is determined whether the distance from the current location to the destination is at the second threshold or under. "Second threshold" can be set so that a vehicle reaches the destination after the water removal process is completed in view of the effective time of the water removal process. If it is determined that the distance from the current location to the destination is at the second threshold or under, the step S15 is performed. If it is determined that the distance from the current location to the destination is not at the second threshold or under, the step S17 is performed.

In the step S15, a command is outputted from the water removal process control part 43 to the water removal process gas supply part so that the water removal process is performed. As described above, the water removal process is performed in the fuel cell system 100 if the distance from the current location to the destination is at the second threshold or under in the water removal process allowed state. After the step S15 is completed, the step S16 is performed.

In the step S16, the state of the water removal process control part 43 is changed to the water removal process prohibited state. "Water removal process prohibited state" is a state where the execution of the water removal process is prohibited. In this state, the water removal process control part 43 does not perform the water removal process. As described above, in the fuel cell system 100, the water removal process control part 43 is brought to the water removal process prohibited state so that the water removal process is not repeated again after performed. After the step S16 is completed, the step S11 is performed again.

The step S17 is a step performed if it is determined that the current location information acquisition part 41, the destination information acquisition part 42 and the water removal process control part 43 are not linked with each other to function in the step S11, if it is determined that the water removal process control part 43 is not in the water removal process allowed state in the step S13, or if it is determined that the distance from the current location to the destination is not at the second threshold or under in the step S14. In the step S17, it is determined whether at least one of the following conditions (1) to (4) is satisfied or not. If at least one of the following conditions (1) to (4) is satisfied, the step S18 is performed. If none of the following conditions (1) to (4) is satisfied, the step S11 is performed again.

(1) If the distance from the current location to the destination is at the first threshold or over;

(2) if at least a predetermined time has passed since the last water removal process;

(3) if the driving distance after the last water removal process is at least a predetermined distance; and (4) if at least a predetermined amount of water is generated after the last water removal process.

(1) is a case where the distance from the current location to the destination is at least a distance that is assumed to lead to necessity to perform the water removal process: for example, a case where a detour or the like is made, which causes the destination to be further enough. "First threshold" can be suitably set according to the result of calculating a distance leading to the necessity of the water removal process based on statistical data, experimental data, etc.

(2) is a case where at least a time period that is assumed to lead to necessity to perform the next water removal process has passed since the last water removal process: for example, a case where a detour or the like is made, which causes the destination to be further enough like (1). "Predetermined time" can be suitably set according to the result of calculating a time period leading to the necessary of the next water removal process after the last water removal process based on statistical data, experimental data, etc.

(3) is a case where the driving distance after the last water removal process is at least a predetermined distance that leads to necessity to perform the next water removal process. "Predetermined distance" can be suitably set based on the relationship between the driving distance and the amount of water generation.

(4) is a case where at least a predetermined amount of water that leads to necessity of the next water removal process is generated after the last water removal process. "Predetermined amount" can be suitably set based on the amount of water in the fuel cell 10 which leads to necessity to perform the water removal process.

In the step S18, the state of the water removal process control part 43 is changed to the water removal process allowed state. If the state before the step S18 is performed is in the water removal process allowed state already, such a state is maintained. After the step S18 is completed, the step S11 is performed again.

The fuel cell system according to the first embodiment has been described as the foregoing using the fuel cell system 100. As described above, in the fuel cell system according to the first embodiment: satisfaction of any of given conditions allows the water removal process, which makes it possible to remove water at a suitable timing; and the water removal process is prohibited after the water removal process, which makes it possible not to repeat the water removal process even if the distance to the destination is short. This can suppress users' uncomfortableness due to the repeated water removal processes.

Here, (i) the water removal process control part in the fuel cell system according to the first embodiment does not necessarily perform the water removal process when a vehicle is being activated. This is because removal noise and/or vibration from the water removal process performed when a vehicle is being activated may feel uncomfortable for users.

The first embodiment may be combined with the second embodiment, which is described later. That is, (ii) the fuel cell system may further comprise: a noise state determination part determining a noise state, wherein if the noise state determination part determines a background noise state, the water removal process control part does not perform the water removal process. This is because when noise from a vehicle is loud, sound from operation of compressors and flow noise from water removal and purging are not noticeable, but in the background noise state, these sound and noise can be noticeably heard, which may feel uncomfortable for users. "Background noise state" is a state where noise is so small that the driver can hear background noise (noise not derived from a vehicle), and is, for example, an idle state or a state where a vehicle is driving at a low speed (for example, at most 20 km an hour). The noise state determination part can determine a noise state of a vehicle from numeral values by, for example, a speed sensor because the faster the speed of a vehicle is, the larger the noise tends to be. The noise level may be actually measured using a microphone or the like.

Figure 3:
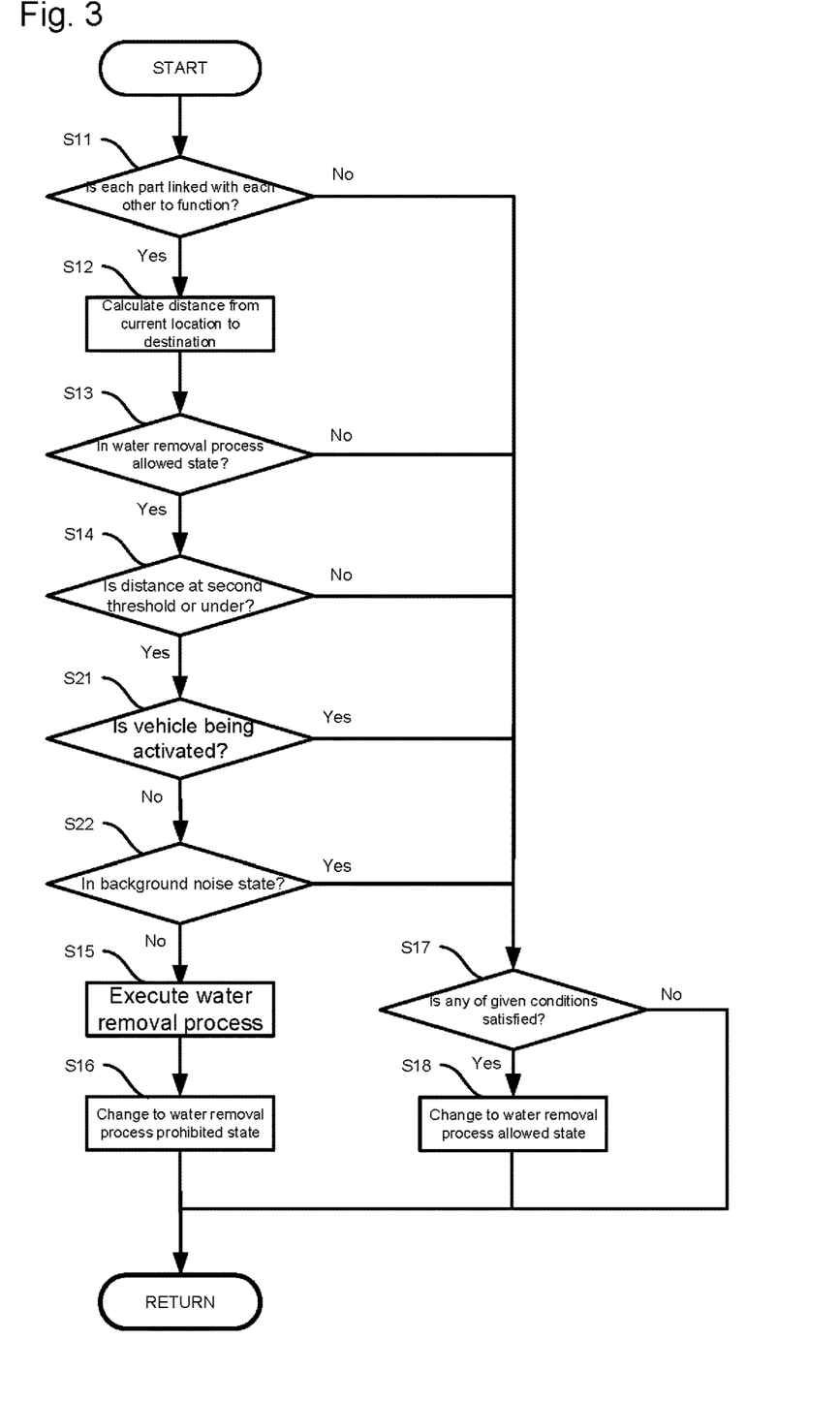
FIG. 3 is one example of a flowchart of water removal control according to a variation.

FIG. 3 shows one example of a flowchart of water removal control according to the first embodiment (variation) including the features of (i) and (ii). The flowchart in FIG. 3 is constituted of the flowchart in FIG. 2, and steps S21 and S22 added between the steps S14 and S15. Hereinafter only the added steps S21 and S22 will be described.

The step S21 is performed after the step S14 is completed. In the step S21, whether a vehicle is being activated or not is determined. If it is determined that a vehicle is being activated, the step S17 is performed. If it is determined that a vehicle is not being activated, the step S22 is performed. As described above, in the variation, the water removal process, which may feel uncomfortable for users when a vehicle is being activated, can be set not being performed.

In the step S22, it is determined whether the state of a vehicle is the background noise state or not. If it is determined that the state is the background noise state, the step S17 is performed. If it is determined that the state is not the background noise state, the step S15 is performed. As described above, in the variation, the water removal process, which may feel uncomfortable for users in the background noise state, can be set not being performed.

Second Embodiment

Next, the second embodiment of the fuel cell system according to the present disclosure will be described. The second embodiment according to the present disclosure is a fuel cell system with which a vehicle is equipped, the fuel cell system comprising: a fuel cell; a water removal process gas supply part capable of supplying a gas for a water removal process for water in the fuel cell; a current location information acquisition part capable of acquiring information on a current location; a destination information acquisition part capable of acquiring information on a destination; a water removal process control part controlling execution of the water removal process; and a noise state determination part determining a noise state, wherein the water removal process control part performs the water removal process if a distance from the current location to the destination is at a second threshold or under, and does not perform the water removal process if the noise state determination part determines a background noise state even if the distance from the current location to the destination is at the second threshold or under.

The major difference between the first embodiment and the second embodiment is that in the second embodiment, the noise state determination part is an essential requirement. The noise state determination part is to determine the noise state of a vehicle, which can be determined by numeral values by, for example, a speed sensor because, as described above, the faster the speed of a vehicle is, the larger the noise tends to be. The noise level may be actually measured using a microphone or the like.

A conventional water removal process is completed before a vehicle reaches a destination, and the noise state when the water removal process is performed is not considered. Therefore, sound from operation of compressors, flow noise from water removal and purging, etc. can be noticeably heard in the background noise state, which may feel uncomfortable for users.

Then, the water removal process control part according to the second embodiment performs the water removal process if the distance from the current location to the destination is at the second threshold or under, and does not perform the water removal process if the noise state determination part determines the background noise state even if the distance from the current location to the destination is at the second threshold or under. This is, in other words, that the water removal process is performed if the distance from the current location to the destination is at the second threshold or under and the noise state determination part determines that the vehicle is not in the background noise state.

Figure 4:
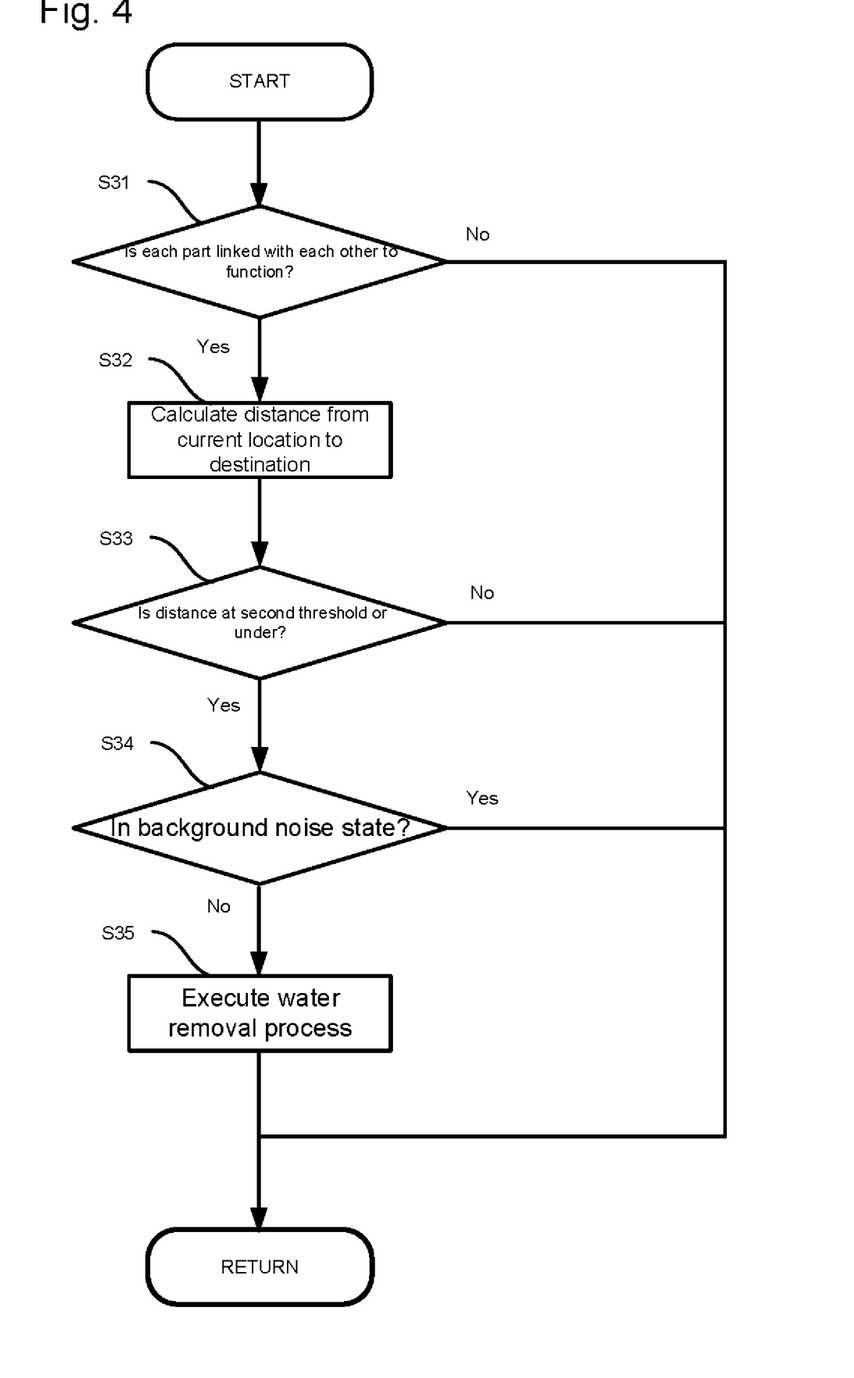
FIG. 4 is one example of a flowchart of water removal control according to the second embodiment.

FIG. 4 is one example of a flowchart of water removal control according to the second embodiment. As in FIG. 4, the water removal control according to the second embodiment includes steps S31 to S35. The water removal control according to the second embodiment is not limited to this though.

In the step S31, it is determined whether the current location information acquisition part, the destination information acquisition part and the water removal process control part are linked with each other to function, which is the same as in the step S11. If it is determined that they are linked with each other to function, the step S32 is performed. If it is determined that they are not linked with each other to function, the step S31 is performed again.

In the step S32, the distance from the current location to the destination is calculated, which is the same as in the step S12. After the step S32 is completed, the step S33 is performed.

In the step S33, it is determined whether the distance from the current location to the destination is at the second threshold or under, which is the same as in the step S14. If it is determined that the distance from the current location to the destination is at the second threshold or under, the step S34 is performed. If it is determined that the distance from the current location to the destination is not at the second threshold or under, the step S31 is performed again.

In the step S34, it is determined whether the state of a vehicle is the background noise state or not. If it is determined that the state is the background noise state, the step S35 is performed. If it is determined that the state is not the background noise state, the step S31 is performed again.

In the step S35, a command is outputted from the water removal process control part to the water removal process gas supply part, so that the water removal process is performed, which is the same as in the step S15. After the step S35 is completed, the step S31 is performed again.

As described above, in the fuel cell system according to the second embodiment, the water removal process is not performed if a vehicle is in the background noise state, and the water removal process is performed if a vehicle is not in the background noise state and any of predetermined conditions is satisfied, which can suppress sound from the water removal process etc. noticeable to users, to suppress user's uncomfortableness.

INDUSTRIAL APPLICABILITY

The fuel cell system according to the present disclosure has been described as the foregoing. The fuel cell system according to the present disclosure is capable of controlling the timing when the water removal process is performed to suppress users' uncomfortableness. Thus, the fuel cell system according to the present disclosure can be said to be an extremely excellent technique in the field of the fuel cell vehicle.

REFERENCE SIGNS LIST 10 fuel cell
20 oxidant gas supply and removal part
21 oxidant gas supply flow path
21a compressor
21b inlet valve
22 oxidant gas removal flow path
22a pressure regulating valve
23 bypass flow path
23a flow divider valve
30 fuel gas supply and removal part
31 fuel gas supply source
32 fuel gas supply flow path
32a on-off valve
32b pressure reducing valve
32c injector
33 fuel off-gas removal flow path
33a gas-liquid separator
33b gas and water removal valve
34 circulation flow path
34a circulating pump
40 control part

What is claimed is:

1. A fuel cell system with which a vehicle is equipped, the fuel cell system comprising:
a fuel cell;
a water removal process gas supply part capable of supplying a gas for a water removal process for water in the fuel cell;
a current location information acquisition part capable of acquiring information on a current location;
a destination information acquisition part capable of acquiring information on a destination; and
a water removal process control part controlling execution of the water removal process,
wherein the water removal process control part changes a state thereof to a water removal process allowed state if at least one of the following conditions is satisfied: if a distance from the current location to the destination is at a first threshold or over; if at least a predetermined time has passed since a last water removal process; if a driving distance after the last water removal process is at least a predetermined distance; and if at least a predetermined amount of water is generated after the last water removal process,
the water removal process control part performs the water removal process if the distance from the current location to the destination is at a second threshold or under in the water removal process allowed state, and
the water removal process control part sets the state thereof in a water removal process prohibited state after performing the water removal process.

2. The fuel cell system according to claim 1, wherein the water removal process control part does not perform the water removal process when the vehicle is being activated.

3. The fuel cell system according to claim 1, the fuel cell system further comprising:
a noise state determination part determining a noise state,
wherein if the noise state determination part determines a background noise state, the water removal process control part does not perform the water removal process.

4. A fuel cell system with which a vehicle is equipped, the fuel cell system comprising:
a fuel cell;
a water removal process gas supply part capable of supplying a gas for a water removal process for water in the fuel cell;
a current location information acquisition part capable of acquiring information on a current location;

a destination information acquisition part capable of acquiring information on a destination;
a water removal process control part controlling execution of the water removal process; and
a noise state determination part determining a noise state,
wherein the water removal process control part performs the water removal process if a distance from the current location to the destination is at a second threshold or under, and does not perform the water removal process if the noise state determination part determines a background noise state even if the distance from the current location to the destination is at the second threshold or under.

* * * * *